(12) United States Patent
Suzuki (10) Patent No.: US 8,903,584 B2
(45) Date of Patent: Dec. 2, 2014

(54) VEHICLE, CONTROL METHOD, AND COMPUTER PROGRAM

(75) Inventor: Masahiro Suzuki, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 13/819,451

(22) PCT Filed: Oct. 20, 2011

(86) PCT No.: PCT/JP2011/074167
§ 371 (c)(1),
(2), (4) Date: Feb. 27, 2013

(87) PCT Pub. No.: WO2012/053596
PCT Pub. Date: Apr. 26, 2012

(65) Prior Publication Data
US 2013/0274976 A1    Oct. 17, 2013

(30) Foreign Application Priority Data
Oct. 22, 2010    (JP) .................................. 2010-237803

(51) Int. Cl.
*B60W 20/00* (2006.01)
*B60K 6/48* (2007.10)
(Continued)

(52) U.S. Cl.
CPC ............... *B60W 20/108* (2013.01); *B60K 6/48* (2013.01); *B60K 6/547* (2013.01); *B60L 11/14* (2013.01); *B60L 15/2054* (2013.01); *B60W 10/02* (2013.01); *B60W 10/08* (2013.01); *B60W 20/00* (2013.01); *B60W 30/18027* (2013.01); *B60W 10/06* (2013.01); *Y02T 10/6221* (2013.01); *Y02T 10/7077* (2013.01); *Y01S 903/93* (2013.01); *Y10S 903/946* (2013.01); *B60W 2550/142* (2013.01)
USPC ................... 701/22; 701/36; 701/48; 701/65; 701/67; 903/946

(58) Field of Classification Search
CPC ................... F16D 48/06; F16D 48/08; B60W 10/02–10/08
See application file for complete search history.

(56) References Cited

U.S. PATENT DOCUMENTS 4,858,131 A * 8/1989 Sugimura et al. ............... 701/68
6,018,198 A * 1/2000 Tsuzuki et al. ................. 290/17
(Continued)

FOREIGN PATENT DOCUMENTS

EP    1970240 A2    9/2008
EP    2065243 A2    6/2009
(Continued)

OTHER PUBLICATIONS

The above references were cited in the International Search Report of the corresponding International Application, PCT/JP2011/074167 dated Dec. 13, 2011, a copy of which is enclosed.

*Primary Examiner* — Jonathan M Dager
(74) *Attorney, Agent, or Firm* — Cowan, Liebowitz & Latman, P.C.; Mark Montague (57) ABSTRACT

The disclosed vehicle, control method, and program lead to improved fuel consumption, durability, and stability. When the vehicle starts to move, a clutch control performs controls so as to set the clutch to a half clutch state, in which a part of the motive force is transmitted, and thereafter to a connected state, in which the entire motive power is transmitted. When the clutch is the half clutch state, an electric motor control unit controls an electric motor to generate an assist torque when the vehicle starts to move equal to the difference between the torque requested by the driver and the idling torque generated when the engine is idling. The disclosed invention can be applied to hybrid vehicles.

7 Claims, 8 Drawing Sheets

(51) Int. Cl.
*B60K 6/547* (2007.10)
*B60L 11/14* (2006.01)
*B60L 15/20* (2006.01)
*B60W 10/02* (2006.01)
*B60W 10/08* (2006.01)
*B60W 30/18* (2012.01)
*B60W 10/06* (2006.01)

(56) References Cited

U.S. PATENT DOCUMENTS

| | | | |
|---|---|---|---|
| 6,336,889 B1* | 1/2002 | Oba et al. | 477/5 |
| 6,342,027 B1* | 1/2002 | Suzuki | 477/5 |
| 6,359,345 B1* | 3/2002 | Suzuki | 290/40 C |
| 6,524,217 B1* | 2/2003 | Murakami et al. | 477/5 |
| 7,347,802 B2* | 3/2008 | Tatara et al. | 477/5 |
| 7,715,971 B2* | 5/2010 | Okuda et al. | 701/93 |
| 7,784,575 B2* | 8/2010 | Yamanaka et al. | 180/65.275 |
| 8,204,659 B2* | 6/2012 | Kouno et al. | 701/55 |
| 8,538,618 B2* | 9/2013 | Nissato | 701/22 |
| 8,565,990 B2* | 10/2013 | Ortmann et al. | 701/67 |
| 8,568,270 B2* | 10/2013 | Terakawa et al. | 477/5 |
| 8,663,063 B2* | 3/2014 | Saito et al. | 477/5 |
| 8,690,733 B2* | 4/2014 | Waku et al. | 477/175 |
| 8,775,004 B2* | 7/2014 | Suzuki | 701/22 |
| 8,818,578 B2* | 8/2014 | Yuda | 701/11 |
| 2004/0040760 A1* | 3/2004 | Kadota | 180/65.2 |
| 2004/0144576 A1* | 7/2004 | Hashimoto | 180/65.2 |
| 2006/0243501 A1* | 11/2006 | Hidaka | 180/65.1 |
| 2006/0272869 A1* | 12/2006 | Hidaka et al. | 180/65.2 |
| 2007/0080006 A1* | 4/2007 | Yamaguchi | 180/65.3 |
| 2007/0199745 A1* | 8/2007 | Hayashi | 180/65.2 |
| 2007/0225113 A1* | 9/2007 | Ogata | 477/3 |
| 2007/0255477 A1* | 11/2007 | Okuda et al. | 701/93 |
| 2007/0272456 A1* | 11/2007 | Shiiba | 180/65.2 |
| 2007/0275818 A1* | 11/2007 | Kouno | 477/3 |
| 2008/0017427 A1* | 1/2008 | Nakanowatari | 180/65.2 |
| 2008/0228363 A1* | 9/2008 | Kouno et al. | 701/54 |
| 2009/0143188 A1* | 6/2009 | Soliman et al. | 477/5 |
| 2009/0143950 A1* | 6/2009 | Hasegawa et al. | 701/68 |
| 2009/0156355 A1* | 6/2009 | Oh et al. | 477/5 |
| 2009/0233766 A1* | 9/2009 | Kadota | 477/176 |
| 2010/0000814 A1* | 1/2010 | Katsuta et al. | 180/65.265 |
| 2010/0108420 A1* | 5/2010 | Keiji | 180/65.275 |
| 2010/0114442 A1* | 5/2010 | Kadota | 701/68 |
| 2011/0136620 A1* | 6/2011 | Gibson et al. | 477/64 |
| 2012/0115659 A1* | 5/2012 | Yamada et al. | 475/5 |

FOREIGN PATENT DOCUMENTS

| | | |
|---|---|---|
| JP | 2003-293816 A | 10/2003 |
| JP | 2005-299797 A | 10/2005 |
| JP | 2009-023527 A | 2/2009 |
| JP | 2009-278770 A | 11/2009 |

* cited by examiner

VEHICLE, CONTROL METHOD, AND COMPUTER PROGRAM

CROSS REFERENCE TO RELATED APPLICATIONS

This is a U.S. national stage of application No. PCT/JP2011/074167, filed on Oct. 20, 2011. Priority under 35 U.S.C. §119(a) and 35 U.S.C. §365(b) is claimed from Japanese Patent Application No. 2010-237803, filed on Oct. 22, 2010, the disclosure of which are also incorporated herein by reference.

TECHNICAL FIELD

The present invention relates to a vehicle, a control method, and a computer program.

BACKGROUND ART

A so-called hybrid vehicle that is driven by an internal combustion engine and an electric motor has been focused. In the hybrid vehicle, the electric motor functions as a generator to regenerate electric power (hereinafter merely referred to as regenerate power), and store the electric power during deceleration. The stored electric power is utilized to generate driving force for accelerating the vehicle or driving the vehicle.

Some hybrid vehicles have an automatic transmission. The automatic transmission is also referred to as a transmission below.

In this case, a clutch that transmits power or cuts the transmission of power can be provided between the internal combustion engine and the electric motor.

There has conventionally been proposed a vehicle including an internal combustion engine, an electric machine that can realize an electric-motor operation and a generator operation, a clutch, a variable ratio transmission, a power electronics, and an electric energy storage device, wherein the clutch is arranged between the internal combustion engine and the transmission so as to transmit driving torque to the transmission from the internal combustion engine, and from the electric machine to the internal combustion engine, via the clutch, and the electric machine is arranged between only clutch arranged between the internal combustion engine and the transmission, and the transmission so as to directly transmit positive or negative toque to the input shaft of the transmission (see, for example, patent literature PTL1).

CITATION LIST

Patent Literature

PTL1: JP 2007-118943 A

SUMMARY OF INVENTION

Technical Problem

However, when the driver starts the vehicle with the internal combustion engine with small displacement, torque upon the start is liable to be insufficient. Therefore, upon starting the vehicle, the internal combustion engine is sharply revved up, and retaining this state, the driving force is gradually transmitted with a partial clutch engagement, in order to increase the speed of the vehicle.

In the method of starting the vehicle as described above, the internal combustion engine consumes large amount of fuel, and in addition, this method encourages the abrasion of the clutch, and causes a temperature rise of the electric motor.

In view of the foregoing circumstance, the present invention aims to solve the above-mentioned problem, i.e., to provide a vehicle, a control method, and a computer program that can prevent the abrasion of the clutch and the temperature rise of the electric motor with less consumption of the fuel, in other words, that can improve fuel consumption rate, durability and stability.

Solution to Problem

In order to solve the above-mentioned problem, according to an aspect of the present invention, a vehicle that is driven by an internal combustion engine and an electric motor, a shaft of the internal combustion engine and a shaft of the electric motor for transmitting power being connected by a clutch that transmits power or cuts the transmission of power includes a device having: a clutch control unit that controls the clutch to be in a partial engagement state for transmitting some power, and then, to be in an engagement state for transmitting the whole power, when the vehicle starts; and an electric motor control unit that controls the electric motor to generate torque assisting the start of the vehicle, when the clutch is in the partial engagement state.

According to the aspect of the present invention, the vehicle described above further includes: a determination unit that determines whether the vehicle starts from an uphill having an inclination equal to or larger than a predetermined inclination; and a correction unit that corrects an upper limit value of torque generated by the electric motor to be smaller, when the determination unit determines that the vehicle starts from an uphill having the inclination equal to or larger than the predetermined inclination.

According to the aspect of the present invention, in the vehicle described above, the electric motor control unit controls the electric motor to generate torque equal to a difference between torque requested by a driver and torque generated by the internal combustion engine.

According to the aspect of the present invention, in the vehicle described above, the electric motor control unit controls the electric motor to generate torque equal to torque requested by the driver.

According to the aspect of the present invention, in the vehicle described above, the electric motor control unit controls the electric motor to increase the rotational speed of the electric motor and to generate torque assisting the start of the vehicle, when the clutch is in a partial engagement state.

According to the aspect of the present invention, in the vehicle described above, the determination unit determines whether or not the difference between the torque requested by the driver and the torque generated from the internal combustion engine exceeds the corrected upper limit value of the torque, when determining that the vehicle starts from the uphill having the inclination equal to or larger than the predetermined inclination, and the electric motor control unit controls the electric motor to generate torque not more than the corrected upper limit value of the torque, when the clutch is in the partial engagement state in the case where the vehicle is determined to start from the uphill having the inclination equal to or larger than the predetermined inclination.

According to another aspect of the present invention, a control method for a vehicle that is driven by an internal combustion engine and an electric motor, a shaft of the internal combustion engine and a shaft of the electric motor for transmitting power being connected by a clutch that transmits power or cuts the transmission of power includes: a clutch control step for controlling the clutch to be in a partial engagement state for transmitting some power, and then, to be in an engagement state for transmitting the whole power, when the vehicle starts; and an electric motor control step for controlling the electric motor to generate torque assisting the start of the vehicle, when the clutch is in the partial engagement state.

According to still another aspect of the present invention, a computer program causes computer, which controls a vehicle that is driven by an internal combustion engine and an electric motor, a shaft of the internal combustion engine and a shaft of the electric motor for transmitting power being connected by a clutch that transmits power or cuts the transmission of power, to execute: a clutch control step for controlling the clutch to be in a partial engagement state for transmitting some power, and then, to be in an engagement state for transmitting the whole power, when the vehicle starts; and an electric motor control step for controlling the electric motor to generate torque assisting the start of the vehicle, when the clutch is in the partial engagement state.

Advantageous Effects of Invention

According to one aspect of the present invention, a vehicle, a control method, and a computer program that can improve fuel consumption rate, durability, and stability can be provided.

DESCRIPTION OF EMBODIMENTS

A hybrid vehicle according to one embodiment of the present invention will be described below with reference to FIGS. 1 to 9.

Figure 1:
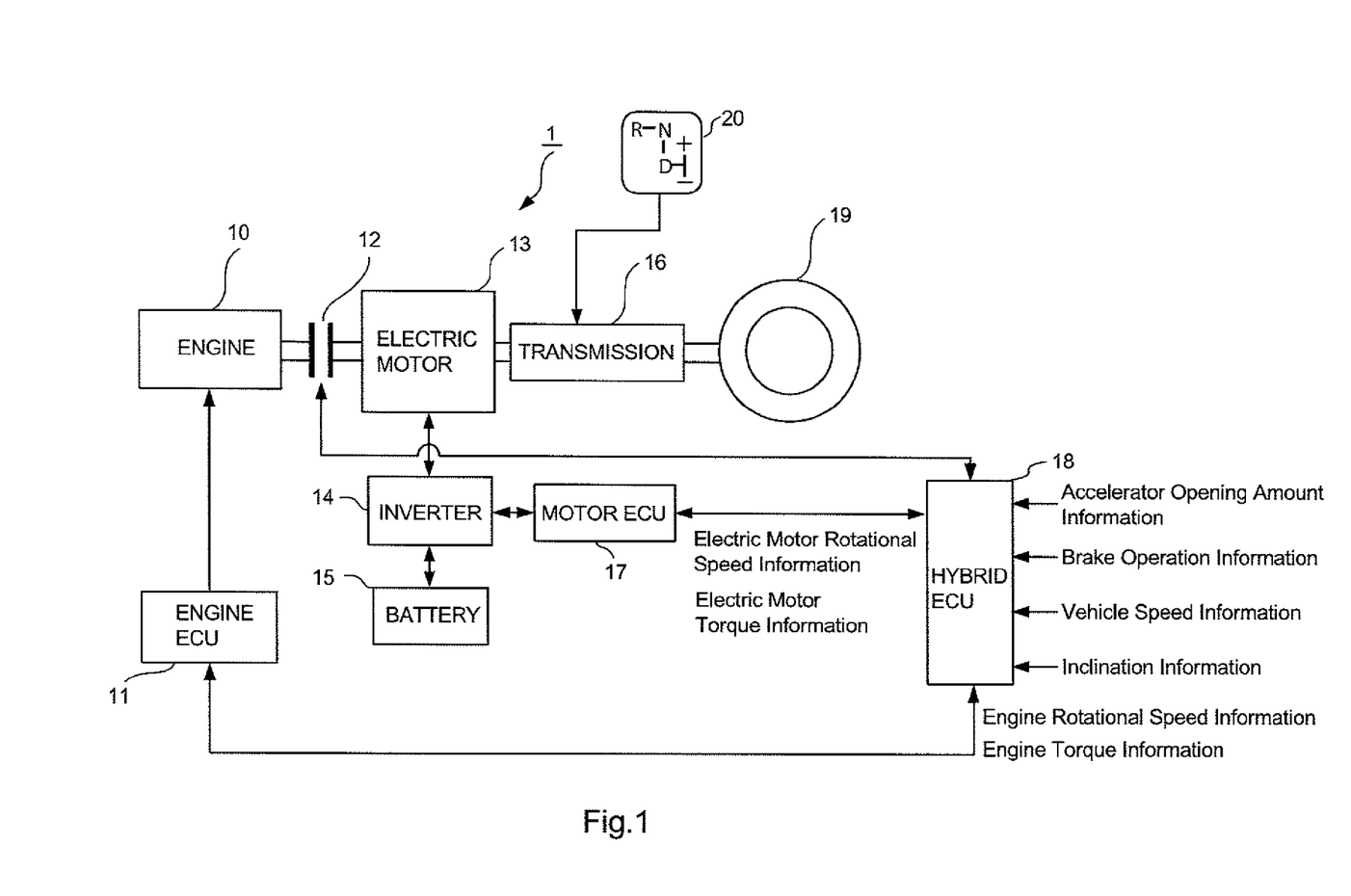
FIG. 1 is a block diagram illustrating an example of a configuration of a hybrid vehicle 1.

FIG. 1 is a block diagram illustrating an example of a configuration of a hybrid vehicle 1. The hybrid vehicle 1 is one example of a vehicle. The hybrid vehicle 1 is driven by an internal combustion engine and/or an electric motor via an automatic transmission, and for example, when the vehicle 1 reduces its speed, electric power can be regenerated by the electric motor. The automatic transmission is referred to as a semiautomatic transmission. It has the same configuration as a manual transmission, but can realize an automatic shift operation.

The hybrid vehicle 1 includes an engine 10, an engine ECU (Electronic Control Unit) 11, a clutch 12, an electric motor 13, an inverter 14, a battery 15, a transmission 16, a motor ECU 17, a hybrid ECU 18, a wheel 19, and a shift unit 20. Note that the transmission 16 has the above-mentioned semiautomatic transmission, and is operated by the shift unit 20 having a drive range (hereinafter referred to as D (Drive) range).

The engine 10 is one example of the internal combustion engine. It is controlled by the engine ECU 11 to burn gasoline, light gas oil, CNG (Compressed Natural Gas), LPG (Liquefied Petroleum Gas), or alternate fuel therein, thereby generating power for rotating a shaft. It then transmits the generated power to the clutch 12.

The engine ECU 11 is a computer that works in conjunction with the motor ECU 17 in accordance with an instruction from the hybrid ECU 18. It controls the engine 10, i.e., controls the fuel injection amount or valve timing. For example, the engine ECU 11 is composed of a CPU (Central Processing Unit), ASIC (Application Specific Integrated Circuit), microprocessor (microcomputer), and DSP (Digital Signal Processor), and includes a calculation unit, a memory, and an I/O (Input/Output) port.

The clutch 12 is controlled by the hybrid ECU 18, and transmits a shaft output from the engine 10 to the wheel 19 via the electric motor 13 and the transmission 16. Specifically, the clutch 12 mechanically connects (hereinafter merely referred to as connection) the rotation shaft of the engine 10 and the rotation shaft of the electric motor 13 to transmit the shaft output of the engine 10 to the electric motor 13, or cuts the mechanical connection between the rotation shaft of the engine 10 and the rotation shaft of the electric motor 13 (hereinafter merely referred to as cut) to allow the rotation shaft of the engine 10 and the rotation shaft of the electric motor 13 to rotate with a different rotational speed, under the control of the hybrid ECU 18.

For example, the clutch 12 mechanically connects the rotation shaft of the engine 10 and the rotation shaft of the electric motor 13, when the hybrid vehicle 1 runs by the power from the engine 10, by which the electric motor 13 generates electric power; when the engine 10 is assisted by the driving force of the electric motor 13; and when the engine 10 is started by the electric motor 13.

For example, the clutch 12 cuts the mechanical connection between the rotation shaft of the engine 10 and the rotation shaft of the electric motor 13, when the engine 10 is stopped or in an idling condition, and the hybrid vehicle 1 runs with the driving force of the electric motor 13, or when the engine 10 is stopped or in an idling condition, the hybrid vehicle 1 reduces its speed, or runs on a downhill, and the electric motor 13 generates electric power (regenerates electric power).

The clutch 12 is different from a clutch that is operated by the driver's operation on a clutch pedal, and the clutch 12 is operated by the control of the hybrid ECU 18.

The electric motor 13 is a so-called motor generator, and it generates power for rotating a shaft by electric power supplied from the inverter 14, and supplies the shaft output to the transmission 16. Alternatively, the electric motor 13 generates electric power by the power for rotating the shaft supplied from the transmission 16, and supplies the electric power to the inverter 14. For example, when the hybrid vehicle 1 increases its speed, or runs with a constant speed, the electric motor 13 generates power for rotating the shaft, and supplies the shaft output to the transmission 16, thereby allowing the hybrid vehicle 1 to run in cooperation with the engine 10. For example, when the electric motor 13 is driven by the engine 10, or when the hybrid vehicle 1 runs without using power, such as in the case where the hybrid vehicle 1 reduces its speed or runs on a downhill, the electric motor 13 operates as a motor generator. In this case, the electric motor 13 generates electric power by the power for rotating the shaft supplied from the transmission 16, and supplies the electric power to the inverter 14, whereby the battery 15 is charged.

The inverter 14 is controlled by the motor ECU 17, and it converts DC voltage from the battery 15 into AC voltage, or converts AC voltage from the electric motor 13 to DC voltage. When the electric motor 13 generates power, the inverter 14 converts the DC voltage from the battery 15 into AC voltage so as to supply the electric power to the electric motor 13. When the electric motor 13 generates electric power, the inverter 14 converts the AC voltage from the electric motor 13 into DC voltage. In other words, in this case, the inverter 14 functions as a rectifier or a voltage regulation device for feeding DC voltage to the battery 15.

The battery 15 is a secondary cell capable of being charged and discharged. It feeds electric power to the electric motor 13 through the inverter 14 when the electric motor 13 generates power, or it is charged by the electric power generated from the electric motor 13 when the electric motor 13 generates electric power.

The transmission 16 has a semiautomatic transmission (not illustrated in the drawings) for selecting any one of plural gear ratios (transmission gear ratios) in accordance with a instruction signal to shift from the hybrid ECU 18. The transmission 16 changes the transmission gear ratio, and transmits the shifted power of the engine 10 and/or the shifted power of the electric motor 13 to the wheel 19. When the vehicle reduces its speed, or runs on the downhill, the transmission 16 transmits power from the wheel 19 to the electric motor 13. The transmission 16 changes gear to bring the vehicle 1 into a driving state in which power is transmitted, into a so-called neutral state in which the transmission of power is cut, or into a reverse state, by the driver's operation on the shift unit 20 for selecting a drive range (D range), a neutral range, or a reverse range. In the semiautomatic transmission, the driver can manually change the gear position to an arbitrary gear number by operating the shift unit 20.

The motor ECU 17 is a computer that works in conjunction with the engine ECU 11 in accordance with an instruction from the hybrid ECU 18. It controls the electric motor 13 by controlling the inverter 14. For example, the motor ECU 17 is composed of a CPU, ASIC, microprocessor (microcomputer), and DSP, and includes a calculation unit, a memory, and an I/O port.

The hybrid ECU 18 is one example of a computer. It acquires accelerator opening amount information, brake operation information, vehicle speed information, inclination information that is acquired from a three-dimensional force sensor (e.g., triaxial gyro) or a three-dimensional acceleration sensor (not illustrated in the drawings) and that indicates an inclination of a road surface, and engine rotational speed information and engine torque information acquired from the engine ECU 11, and an electric-motor rotational speed information and electric-motor torque information acquired from the motor ECU 17, and controls the engine 10, the clutch 12, and the electric motor 13 by referring to the acquired information.

More specifically, the hybrid ECU 18 issues an instruction to the clutch 12 to control the same. The hybrid ECU 18 issues an instruction to control the electric motor 13 and the inverter 14 to the motor ECU 17, thereby controlling the electric motor 13. The hybrid ECU 18 also issues an instruction to control the engine 10 to the engine ECU 11, thereby controlling the engine 10. For example, the hybrid ECU 18 is composed of a CPU, ASIC, microprocessor (microcomputer), and DSP, and includes a calculation unit, a memory, and an I/O port.

A computer program executed by the hybrid ECU 18 is stored beforehand into a non-volatile memory in the hybrid ECU 18, whereby the computer program can preliminarily be installed to the hybrid ECU 18 that is a computer.

The engine ECU 11, the motor ECU 17, and the hybrid ECU 18 are interconnected with a bus in accordance with a standard such as CAN (Control Area Network).

The wheel 19 is a driving wheel that transmits driving force to a road surface. Although FIG. 1 illustrates only one wheel 19, the hybrid vehicle 1 actually includes plural wheels 19.

Figure 2:
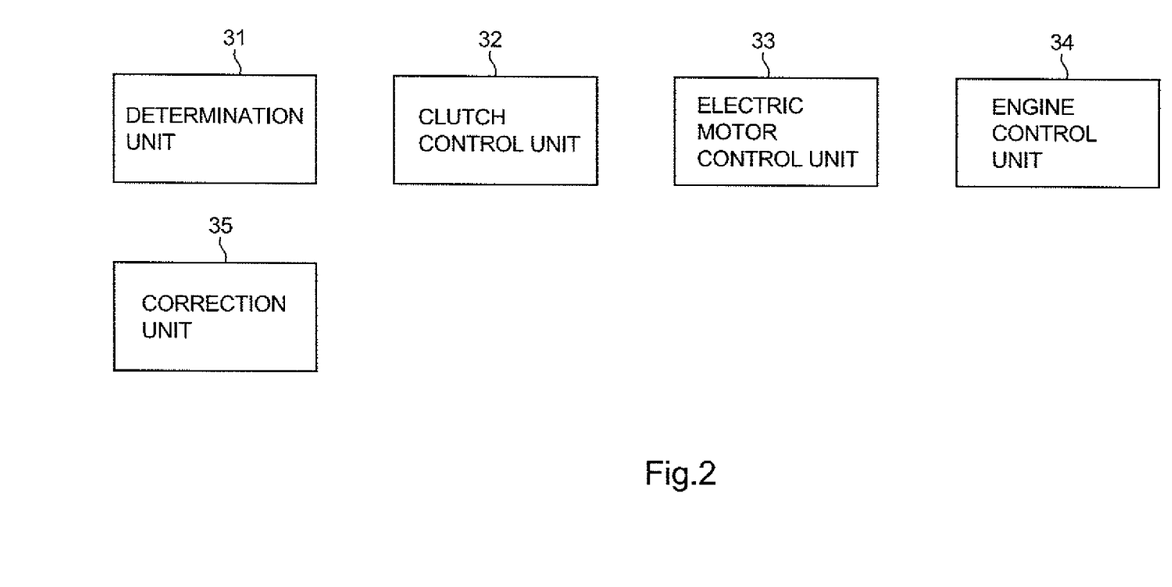
FIG. 2 is a block diagram illustrating an example of a configuration of functions realized in a hybrid ECU 18.

FIG. 2 is a block diagram illustrating an example of a configuration of functions realized in the hybrid ECU 18. Specifically, when the hybrid ECU 18 executes the computer program, a determination unit 31, a clutch control unit 32, an electric motor control unit 33, an engine control unit 34, and a correction unit 35 can be realized. The determination unit 31 performs various determinations, such as a determination as to whether a condition for an assist start in which the vehicle starts with the electric motor 13 assisting the engine 10 is established or not, or a determination as to whether a condition for engaging the clutch 12 is established or not.

The clutch control unit 32 issues an instruction to the clutch 12 so as to control the clutch 12 to be in an engagement state, in a disengagement state, or in a partial engagement state for transmitting some power.

The electric motor control unit 33 issues an instruction to the motor ECU 17 to control the electric motor 13 and the inverter 14, thereby controls the electric motor 13 to rotate with a desired rotational speed so as to generate desired torque.

The engine control unit 34 issues an instruction to the engine ECU 11 to control the engine 10, thereby controls the engine 10 to rotate with a desired rotational speed so as to generate desired torque.

The correction unit 35 acquires an inclination of a road from the inclination information acquired from the inclination sensor which is not illustrated in the drawings. When the road is uphill with an inclination equal to or larger than a predetermined inclination, the correction unit 35 corrects the assist start torque to increase the assist start torque, which is a threshold value for determining whether the engine 10 is assisted or not by the driving force of the electric motor 13, according to the inclination. When the road is uphill with an inclination equal to or larger than a predetermined inclination, the correction unit 35 corrects the assist full torque to decrease the assist full torque, which is an upper limit value of the torque of the electric motor 13 when the engine 10 is assisted by the driving force of the electric motor 13, according to the inclination.

The assist start torque can be used when the driver starts the vehicle or when the driver drives the vehicle, and it can be classified into assist start torque for starting used for starting the vehicle and assist start torque in normal state used for driving the vehicle.

Figure 3:
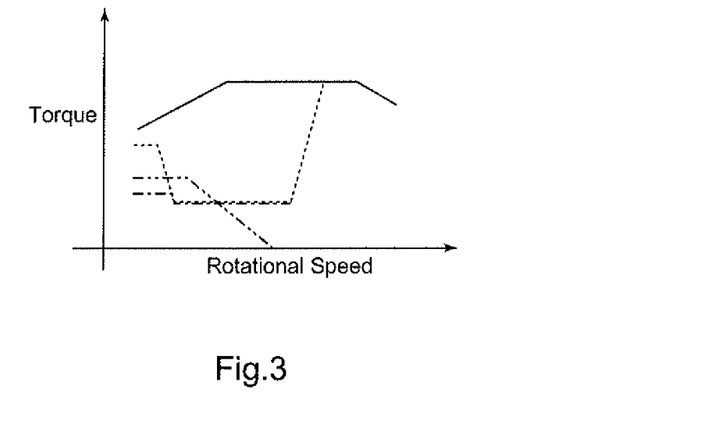
FIG. 3 is a view illustrating examples of vehicle full torque, assist start torque in normal state, assist start torque for starting the vehicle, and assist full torque.

FIG. 3 is a view illustrating examples of vehicle full torque that is the maximum torque generated by the engine 10, the assist start torque in normal state, the assist start torque for starting the vehicle, and assist full torque that is the maximum torque generated by the electric motor 13. In FIG. 3, a vertical axis indicates torque, and a horizontal axis indicates a rotational speed. In FIG. 3, a solid line indicates the vehicle full torque, a dotted line indicates the assist start torque in normal state, a chain line indicates the assist start torque for starting the vehicle, and a two-dot chain line indicates the assist full torque.

As illustrated in FIG. 3, the assist start torque for starting is set to have the value equal to the assist start torque in normal state, excluding a low-rotation area, and is set to have a value smaller than the assist start torque in normal state in the low-rotation area.

As illustrated in FIG. 3, the assist full torque has a constant maximum value in the low-rotation area, and gradually decreases with the increase in the rotational speed.

Figure 4:
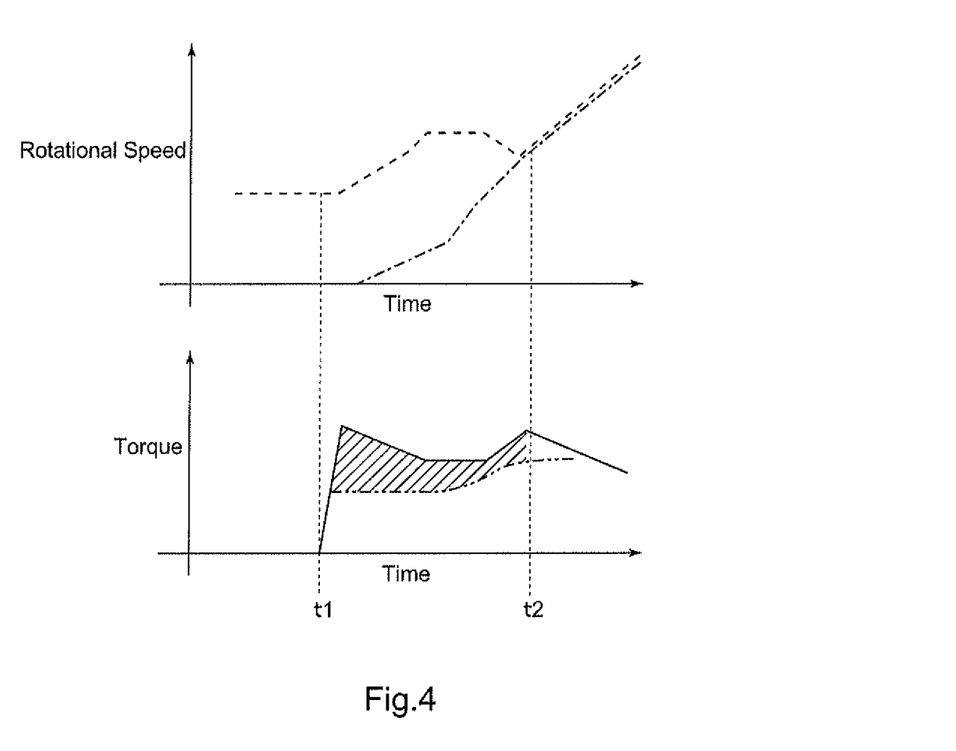
FIG. 4 is a time chart for describing an example of an assist start control.

FIG. 4 is a time chart for describing an example of the assist start control for starting the vehicle with the engine 10 being assisted by the driving force of the electric motor 13.

In FIG. 4, a dotted line indicates the rotational speed of the engine 10, and a chain line indicates the rotational speed of the electric motor 13. A solid line indicates driver request torque that is the torque required by the driver according to the depression amount of the accelerator pedal depressed by the driver, and a two-dot chain line indicates engine torque that is torque generated by the engine 10.

In FIG. 4, the vehicle starts moving from a time t1. The clutch 12 is in a partial engagement state from the time t1. When the driver intends to drive the vehicle, the driver depresses the accelerator pedal. Therefore, the driver request torque increases, and the driver request torque is almost constant until the vehicle starts moving (the speed reaches initial rate).

Then, the rotational speed of the engine 10 rises from the idling state, so that the engine 10 generates predetermined torque. With this, the electric motor 13 increases the rotational speed to generate the torque assisting the starting.

On a time t2, the rotational speed of the engine 10 and the rotational speed of the electric motor 13 become almost the same, and the clutch 12 is engaged.

After the time t2, the vehicle is in the normal assist state in which the driving force of the electric motor 13 assists the driving of the vehicle.

Figure 5:
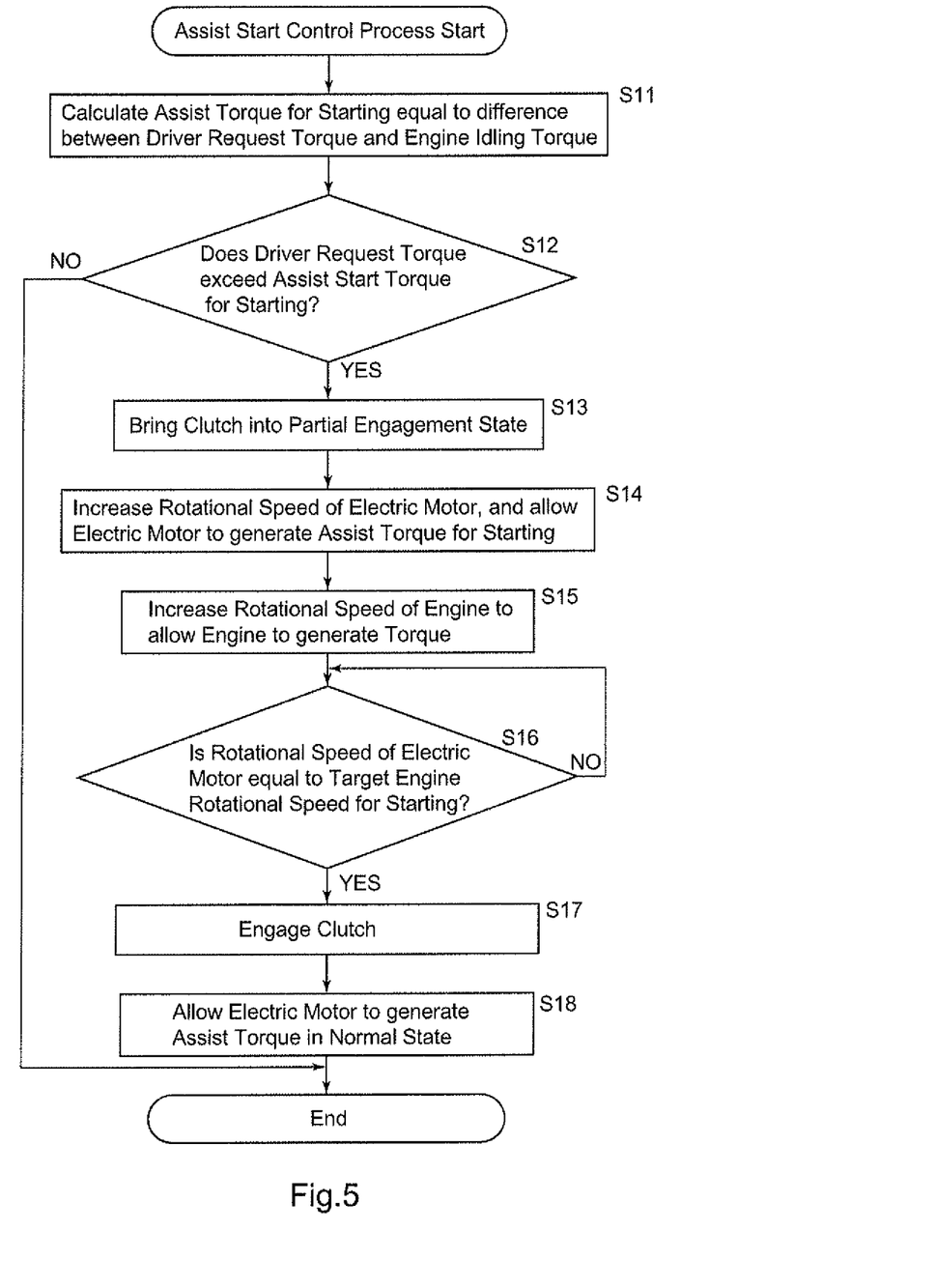
FIG. 5 is a flowchart illustrating an example of a process of the assist start control.

FIG. 5 is a flowchart illustrating an example of a process of the assist start control. In step S11, the electric motor control unit 33 calculates an assist torque for starting the vehicle that is equal to the difference between the driver request torque according to the depression amount of the accelerator pedal depressed by the driver and the idling torque that is generated when the engine 10 is in the idling state.

In step S12, the determination unit 31 determines whether the driver request torque exceeds the assist start torque for starting or not. When it is determined that the driver request torque exceeds the assist start torque for starting in step S12, the vehicle starts moving with the torque (driving force) of the electric motor 13 assisting the torque of the engine 10. Therefore, the process proceeds to step S13 where the clutch control unit 32 issues an instruction to the clutch 12 in order to control the clutch 12 to be in the partial engagement state.

In step S14, the electric motor control unit 33 issues an instruction to the motor ECU 17 to control the electric motor 13 and the inverter 14, thereby increasing the rotational speed of the electric motor 13, and allowing the electric motor 13 to generate the assist start torque for starting. In step S15, the engine control unit 34 issues an instruction to the engine ECU 11 to control the engine 10, thereby increasing the rotational speed of the engine 10, and allowing the engine 10 to generate torque.

In step S16, the determination unit 31 determines whether the rotational speed of the electric motor 13 becomes equal to a target engine rotational speed for starting that is determined beforehand. When it is determined that the rotational speed of the electric motor 13 does not become equal to the rotational speed of the target engine rotational speed for starting, the determination unit 31 repeats the determination process, until the rotational speed of the electric motor 13 becomes equal to the target engine rotational speed for starting.

When it is determined that the rotational speed of the electric motor 13 becomes equal to the target engine rotational speed for starting in step S16, the process proceeds to step S17 where the clutch control unit 32 issues an instruction to the clutch 12 in order to control the clutch 12 to be in the engagement state.

In step S18, the electric motor control unit 33 issues an instruction to the motor ECU 17 to control the electric motor 13 and the inverter 14, thereby controls the electric motor 13 to generate an assist torque in normal state. Then, the process of the assist start control is ended.

When it is determined that the driver request torque does not exceed the assist start torque for starting in step S12, the assist by the electric motor 13 is unnecessary for starting the vehicle. Therefore, the assist by the electric motor 13 is not carried out, so that the assist start control is ended, and the vehicle starts moving only by the driving force of the engine 10.

As described above, the driving force (torque) of the electric motor 13 assists the engine 10 when the vehicle starts. Therefore, it is unnecessary to rapidly increase the rotational speed of the engine 10. Accordingly, the fuel consumption is improved, and the rotational speed of the engine 10 can be kept down, whereby the abrasion of the clutch 12 can be prevented. It is only necessary that the electric motor 13 generates necessary torque during a short period in which the clutch 12 is in the partial engagement state, whereby the temperature rise of the electric motor 13 and the inverter 14 can be prevented.

As described above, the fuel consumption can be reduced, and the abrasion of the clutch and the temperature rise of the electric motor can be prevented. In other words, the present embodiment can enhance fuel consumption, durability, and stability.

When the SOC (state of charge) of the battery 15 is low (when the amount of charge is low), the assist starting is not carried out, and the vehicle starts only with the driving force of the engine 10, even if the assist torque for starting exceeds the assist start torque for starting.

Upon the start of the vehicle, the electric motor 13 may generate whole driver request torque according to the depression amount of the accelerator pedal depressed by the driver.

Figure 6:
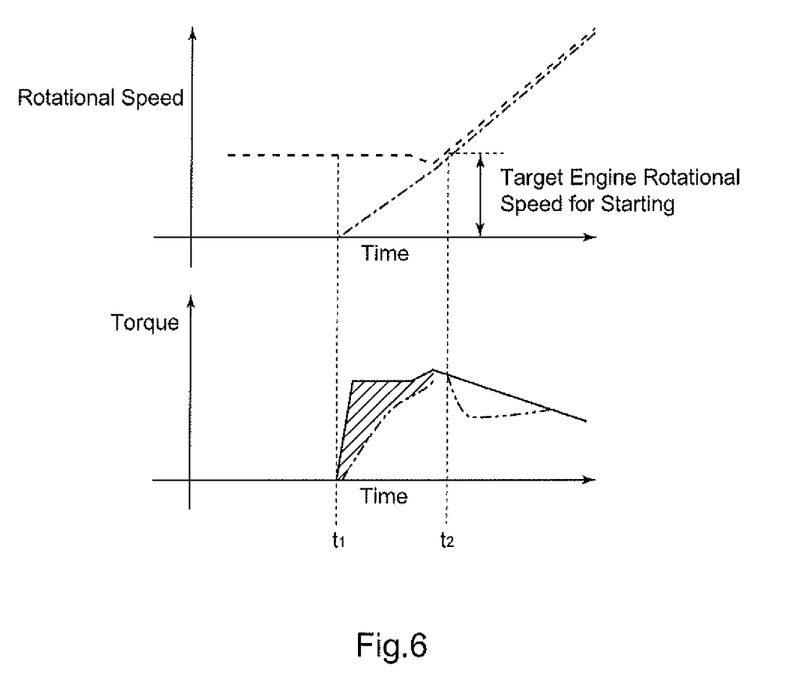
FIG. 6 is a time chart for describing another example of the assist start control.

FIG. 6 is a time chart for describing the assist start control, when the electric motor 13 generates the driver request torque upon the start of the vehicle.

In FIG. 6, a dotted line indicates the rotational speed of the engine 10, and a chain line indicates the rotational speed of the electric motor 13. A solid line indicates the driver request torque, and a two-dot chain line indicates engine torque.

In FIG. 6, the vehicle starts running from a time t1. The clutch 12 is in a partial engagement state from the time t1. When the driver intends to drive the vehicle, the driver depresses the accelerator pedal. Therefore, the driver request torque increases, and the driver request torque is almost constant until the vehicle starts moving (the speed reaches initial rate).

In this case, the engine 10 keeps an idling rotational speed. Simultaneously, the electric motor 13 increases the rotational speed, and generates the driver request torque necessary for starting the vehicle.

On a time t2, the rotational speed of the engine 10 and the rotational speed of the electric motor 13 become almost the same, and the clutch 12 is engaged.

Specifically, during the period from the time t1 to time t2 when the clutch is in the partial engagement state, the hybrid vehicle 1 is driven to start only by the driving force of the electric motor 13.

After the time t2, the vehicle is in the normal assist state in which the driving force of the electric motor 13 assists the driving of the vehicle.

Figure 7:
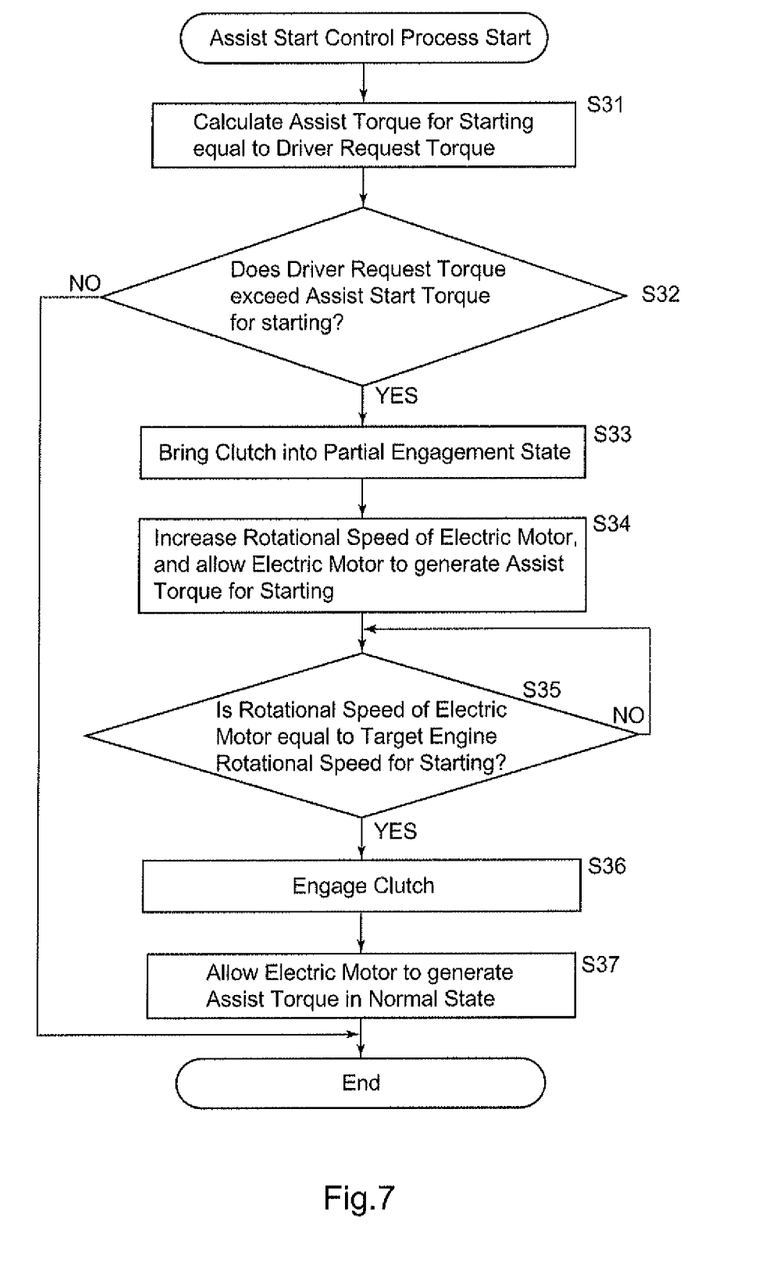
FIG. 7 is a flowchart illustrating another example of the process of the assist start control.

FIG. 7 is a flowchart for describing another example of the process of the assist start control, when the electric motor 13 generates the driver request torque upon the start of the vehicle. In step S31, the electric motor control unit 33 calculates an assist torque for starting equal to the driver request torque according to the depression amount of the accelerator pedal depressed by the driver.

The processes in steps S32 to S34 are the same as those in steps S12 to S14 in FIG. 5, and the description thereof will not be repeated. The processes in steps S35 to S37 are the same as those in steps S16 to S18 in FIG. 5, and the description thereof will not be repeated.

As described above, the driver request torque can be generated by the electric motor 13 upon the start of the vehicle.

When the vehicle 1 starts with the engine 10 being assisted by the driving force of the electric motor 13 on an uphill having a sharp inclination, the period in which the clutch is in the partial engagement state becomes long. In this case, the discharge amount of the battery 15 is excessive, so that the balance of the SOC of the battery 15 might be disrupted.

In view of this, the assist start torque is rather increased, when the inclination sensor detects that the uphill has a sharp inclination. Thus, the electric motor 13 compensates only the torque corresponding to an amount that cannot be supplied as the power performance from the engine 10 with small displacement, and the basic power is fed by the engine 10. The control described above can reduce a fear that the balance of the SOC of the battery 15 is disrupted because of the excessive assist by the electric motor 13, and can shorten the period in which the clutch is in the partial engagement state.

On a flat road, the electric motor 13 can generate most of the driver request torque, whereby the vehicle speed is promptly increased to a speed by which the period of the partial engagement state of the clutch is ended. This can shorten the period of the partial engagement state of the clutch, and prevent the engine 10 from revving up upon the start of the vehicle, whereby the fuel consumption can be improved with less power consumption.

Figure 8:
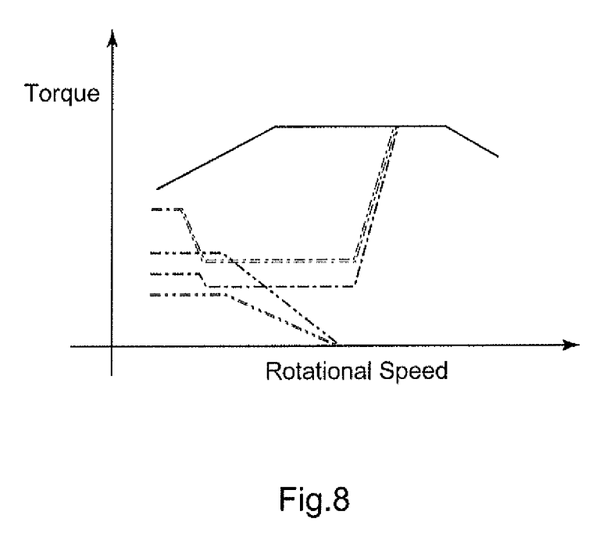
FIG. 8 is a view illustrating examples of vehicle full torque, assist start torque, and assist full torque.

FIG. 8 is a view illustrating examples of the vehicle full torque, assist start torque, and assist full torque. In FIG. 8, a vertical axis indicates torque, and a horizontal axis indicates a rotational speed. In FIG. 8, a solid line indicates the vehicle full torque, a chain line indicates the assist start torque on a flat road, and a double chain line indicates the assist start torque on an uphill having sharp inclination. A two-dot chain line indicates the assist full torque on the flat road, and a double two-dot chain line indicates the assist full torque on the uphill having sharp inclination.

As illustrated in FIG. 8, the assist start torque on the uphill having sharp inclination has a value larger than the assist start torque on the flat road. The assist full torque on the uphill having sharp inclination has a value smaller than the assist full torque on the flat road.

Figure 9:
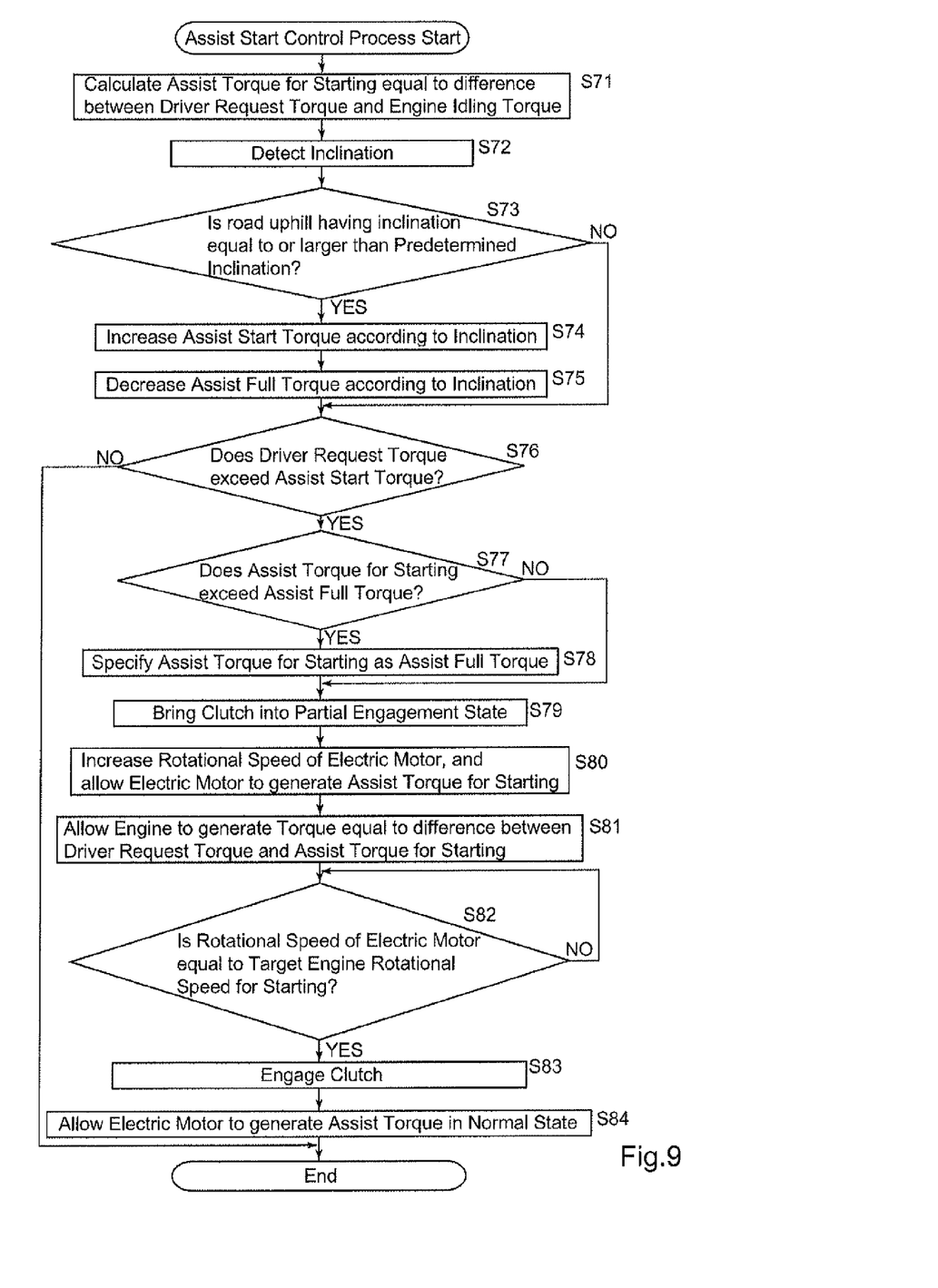
FIG. 9 is a flowchart illustrating still another example of the process of the assist start control.

FIG. 9 is a flowchart illustrating still another example of the process of the assist start control. In step S71, the electric motor control unit 33 calculates an assist torque for starting the vehicle that is equal to the difference between the driver request torque according to the depression amount of the accelerator pedal depressed by the driver and the idling torque that is generated when the engine 10 is in the idling state.

In step S72, the determination unit 31 acquires the inclination information indicating the inclination of the road surface, thereby detecting the inclination of the road surface. The inclination information is also fed to the correction unit 35. In step S73, the determination unit 31 determines whether or not the uphill has an inclination equal to or larger than a predetermined inclination by referring to the inclination information. When the determination unit 31 determines that the uphill has the inclination equal to or larger than the predetermined inclination in step S73, the correction unit 35 increases the assist start torque according to the inclination indicated by the inclination information in step S74. In this case, the correction unit 35 may increase the assist start torque in proportion to the inclination, may non-linearly increase the assist start torque with respect to the inclination, or may increase the assist start torque in a stepwise manner.

In step S75, the correction unit 35 decreases the assist full torque according to the inclination indicated by the inclination information. In this case, the correction unit 35 may linearly decrease the assist full torque with respect to the inclination, may non-linearly decrease the assist full torque with respect to the inclination, or may decrease the assist full torque in a stepwise manner. After step S75, the process proceeds to step S76.

When the determination unit 31 determines that the uphill does not have the inclination equal to or larger than the predetermined inclination in step S73, the processes in step S74 and step S75 are skipped, so that the assist start torque and the assist full torque are not corrected.

In step S76, the determination unit 31 determines whether the driver request torque exceeds the assist start torque or not. When it is determined that the driver request torque exceeds the assist start torque in step S76, the process proceeds to step S77 where the determination unit 31 determines whether the assist torque for starting exceeds the assist full torque or not.

When it is determined that the assist torque for starting exceeds the assist full torque in step S77, the process proceeds to step S78 where the correction unit 35 specifies the assist torque for starting as the assist full torque. In other words, the value of the assist torque for starting becomes equal to the value of the assist full torque. After step S78, the process proceeds to step S79.

When the determination unit 31 determines that the assist torque for starting does not exceed the assist full torque in step S77, the process in step S78 is skipped, so that the assist torque for starting is not corrected, and the process proceeds to step S79.

In step S79, the clutch control unit 32 issues an instruction to the clutch 12 to control the clutch 12, whereby the clutch 12 is in the partial engagement state.

In step S80, the electric motor control unit 33 issues an instruction to the motor ECU 17 to control the electric motor 13 and the inverter 14, thereby controlling the electric motor 13 to increase the rotational speed of the electric motor 13, and allowing the electric motor 13 to generate the assist torque for starting.

In step S81, the engine control unit 34 issues an instruction to the engine ECU 11 to control the engine 10, thereby controlling the engine 10, whereby the engine 10 generates the torque equal to the difference between the driver request torque and the assist torque for starting.

In step S82, the determination unit 31 determines whether the rotational speed of the electric motor 13 becomes equal to the target engine rotational speed for starting the vehicle that is determined beforehand. When it is determined that the rotational speed of the electric motor 13 does not become equal to the rotational speed of the target engine rotational speed for starting, the determination unit 31 repeats the determination process, until the rotational speed of the electric motor 13 becomes equal to the target engine rotational speed for starting.

When it is determined that the rotational speed of the electric motor 13 becomes equal to the target engine rotational speed for starting in step S82, the process proceeds to step S83 where the clutch control unit 32 issues an instruction to the clutch 12 in order to control the clutch 12 to be in the engagement state.

In step S84, the electric motor control unit 33 issues an instruction to the motor ECU 17 to control the electric motor 13 and the inverter 14, thereby controls the electric motor 13 to set the torque of the electric motor 13 as 0. In step S85, the electric motor control unit 33 issues an instruction to the motor ECU 17 to control the electric motor 13 and the inverter 14, thereby controls the electric motor 13 to generate the assist torque in normal state. Then, the process of the assist start control is ended.

When it is determined that the driver request torque does not exceed the assist start torque in step S76, the assist by the electric motor 13 is unnecessary for starting the vehicle. Therefore, the vehicle starts normally without the assist by the electric motor 13, so that the assist start control is ended.

When the inclination of the uphill is sharp, the assist start torque is rather increased to compensate only the insufficient torque of the engine 10 by the electric motor 13, and the basic power (torque) is generated by the engine 10. Accordingly, the excessive discharge of the battery 15 can be prevented, and the period of the partial engagement state of the clutch can be shortened.

Most of the driver request torque is generated by the electric motor 13 on the flat road. Therefore, the vehicle speed can promptly be increased to a speed by which the period of the partial engagement state of the clutch is ended. Accordingly, this can shorten the period of the partial engagement state of the clutch, and can prevent the engine 10 from revving up upon the start of the vehicle, and can improve fuel consumption with less power consumption.

It is described above that the engine 10 is the internal combustion engine. However, the engine 10 may be a thermal engine including an external combustion engine.

The computer program executed by the hybrid ECU 18 is installed beforehand in the hybrid ECU 18 in the above description. However, a removable media on which the computer program is stored (that stores the computer program) may be attached to a drive not illustrated, and the computer program read from the removable media may be stored on the non-volatile memory in the hybrid ECU 18, or the computer program sent via a wired or wireless transfer medium may be received by a communication unit not illustrated, and stored in the non-volatile memory in the hybrid ECU 18, whereby the computer program may be installed to the hybrid ECU 18 that is a computer.

The respective ECUs may be realized by an ECU having some of these functions or all of these functions. Alternatively, an ECU having classified functions of each ECU may newly be provided.

The computer program executed by the computer may be a computer program by which the process is executed in a time-series manner according to the order described in the present specification, or may be a computer program by which the process is executed simultaneously, or on a necessary timing when called.

The embodiment of the present invention is not limited to the above-mentioned embodiment, and various modifications are possible without departing from the gist of the present invention.

The invention claimed is:

1. A vehicle that is driven by an internal combustion engine and an electric motor, a shaft of the internal combustion engine and a shaft of the electric motor for transmitting power being connected by a clutch that transmits power or cuts the transmission of power, the vehicle comprising a device including:
    a clutch control unit that controls the clutch to be in a partial engagement state for transmitting some power, and then, to be in an engagement state for transmitting the whole power, when the vehicle starts;
    an electric motor control unit that controls the electric motor to generate torque assisting the start of the vehicle, when the clutch is in the partial engagement state;
    a determination unit that determines whether the vehicle starts from an uphill having an inclination equal to or larger than a predetermined inclination; and
    a correction unit that corrects the assist start torque larger than that on a flat road and corrects an upper limit value of the torque, generated by the electric motor, to be small, when the vehicle is determined to start from the uphill having the inclination equal to or larger than the predetermined inclination.

2. The vehicle according to claim 1, wherein the electric motor control unit controls the electric motor to generate torque equal to the difference between torque requested by a driver and torque generated by the internal combustion engine.

3. The vehicle according to claim 1, wherein the electric motor control unit controls the electric motor to generate torque equal to torque requested by a driver.

4. The vehicle according to claim 1, wherein the electric motor control unit controls the electric motor to increase the rotational speed of the electric motor, and to generate torque assisting the start of the vehicle, when the clutch is in the partial engagement state.

5. The vehicle according to claim 1, wherein the determination unit determines whether the difference between the torque requested by the driver and the torque generated by the internal combustion engine exceeds the corrected upper limit value of the torque or not, when the vehicle is determined to start from the uphill having the inclination equal to or larger than the predetermined inclination, and
    the electric motor control unit controls the electric motor to generate torque not more than the corrected upper limit value of the torque, when the clutch is in the partial engagement state in case where said difference is determined as exceeding the corrected upper limit value of the torque.

6. A control method for a vehicle that is driven by an internal combustion engine and an electric motor, a shaft of the internal combustion engine and a shaft of the electric motor for transmitting power being connected by a clutch that transmits power or cuts the transmission of power, the method comprising:
    a clutch control step for controlling the clutch to be in a partial engagement state for transmitting some power, and then, to be in an engagement state for transmitting the whole power, when the vehicle starts;
    an electric motor control step for controlling the electric motor to generate torque assisting the start of the vehicle, when the clutch is in the partial engagement state;
    a determination step for determining whether the vehicle starts from an uphill having an inclination equal to or larger than a predetermined inclination; and
    a correction step for correcting the assist start torque larger than that on a flat road and correcting an upper limit value of the torque, generated by the electric motor, to be small, when the vehicle is determined to start from the uphill having the inclination equal to or larger than the predetermined inclination.

7. A non-transitory computer-readable storage medium for storing a computer program that causes a computer, which controls a vehicle that is driven by an internal combustion engine and an electric motor, a shaft of the internal combustion engine and a shaft of the electric motor for transmitting power being connected by a clutch that transmits power or cuts the transmission of power, to execute:
- a clutch control step for controlling the clutch to be in a partial engagement state for transmitting some power, and then, to be in an engagement state for transmitting the whole power, when the vehicle starts;
- an electric motor control step for controlling the electric motor to generate torque assisting the start of the vehicle, when the clutch is in the partial engagement state;
- a determination step for determining whether the vehicle starts from an uphill having an inclination equal to or larger than a predetermined inclination; and
- a correction step for correcting the assist start torque larger than that on a flat road and correcting an upper limit value of the torque, generated by the electric motor, to be small, when the vehicle is determined to start from the uphill having the inclination equal to or larger than the predetermined inclination.

* * * * *